US006595675B2

(12) United States Patent
Dongo (10) Patent No.: US 6,595,675 B2
(45) Date of Patent: Jul. 22, 2003

(54) POOL/SPA WATERFALL UNIT WITH FIBER OPTIC ILLUMINATION (75) Inventor: Paul Dongo, Camarillo, CA (US)

(73) Assignee: Waterway Plastics, Inc., Oxnard, CA (US)

( * ) Notice: Subject to any disclaimer, the term of this patent is extended or adjusted under 35 U.S.C. 154(b) by 0 days.

(21) Appl. No.: 09/839,561

(22) Filed: Apr. 23, 2001

(65) Prior Publication Data

US 2002/0154516 A1 Oct. 24, 2002

(51) Int. Cl.[7] .................................................. F21V 7/04
(52) U.S. Cl. ........................ 362/562; 362/96; 362/556; 40/406
(58) Field of Search .......................... 362/96, 101, 556, 362/562, 580; 40/406

(56) References Cited

U.S. PATENT DOCUMENTS

| 1,651,887 | A |   | 12/1927 | Hawes |   |
| 3,292,861 | A |   | 12/1966 | Kawamura et al. |   |
| 4,617,615 | A |   | 10/1986 | Eychaner | 362/216 |
| 4,749,126 | A | * | 6/1988 | Kessener et al. | 239/12 |
| 4,881,280 | A |   | 11/1989 | Lesikar | 4/507 |
| 5,051,875 | A |   | 9/1991 | Johnson | 362/101 |
| 5,115,974 | A |   | 5/1992 | Tobias et al. | 239/23 |
| 5,122,936 | A |   | 6/1992 | Guthrie | 362/101 |
| 5,249,744 | A |   | 10/1993 | Ruthenberg | 239/23 |
| 5,271,561 | A |   | 12/1993 | Tobias et al. | 239/289 |
| 5,388,285 | A |   | 2/1995 | Belniak | 4/507 |
| 5,537,696 | A |   | 7/1996 | Chartier | 4/507 |
| 5,881,401 | A |   | 3/1999 | Saputo | 4/490 |
| 6,132,056 | A | * | 10/2000 | Ruthenberg | 239/18 |
| 6,170,094 | B1 |   | 1/2001 | Weise et al. | 4/507 |

OTHER PUBLICATIONS

Waterway, 1999 Pool, Spa, Bath Buyer's Guide, Lights p. 31.
Sheer Descent™, State of the Art Waterfalls, Back Feed System, Installation Manual, Jandy Industries, 1996, p. 2–15.

* cited by examiner

Primary Examiner—Sandra O'Shea
Assistant Examiner—Guiyoung Lee
(74) Attorney, Agent, or Firm—Koppel, Jacobs, Patrick & Heybl (57) ABSTRACT An illuminated waterfall unit for a spa or pool comprises a manifold body with a water outlet that forms outflowing water into a waterfall. An optical probe is positioned within the manifold body to receive light from a light source, preferably an optical fiber, and to illuminate the waterfall by optical transmission through the outlet body. The probe is preferably positioned so that is also illuminates the waterfall directly.

31 Claims, 9 Drawing Sheets

POOL/SPA WATERFALL UNIT WITH FIBER OPTIC ILLUMINATION

BACKGROUND OF THE INVENTION

1. Field of the Invention

This invention relates to waterfall units for pools and spas and more particularly to waterfall units generating an illuminated waterfall.

2. Description of the Related Art

Reservoirs of water such as pools, spas, hot tubs, bath tubs and the like (collectively referred to as "spas" or "spa") can be constructed with one or more waterfall units that provide a waterfall running from the spa's edge to the surface of the water below. The waterfall is visually appealing and provides a soothing sound. Conventional waterfall units are connected to the water supply from the spa's plumbing and have internal baffling structures that convert the relatively turbulent water from the plumbing to a smooth laminar flow appropriate for a waterfall. Most of the waterfall unit is behind the wall of the spa where it is connected to the spa's plumbing. The only visible portion is its outlet.

Various waterfall units have been developed for use in spas. U.S. Pat. No. 4,881,280 to Lesikar discloses a waterfall unit that is mounted on the spa's edge and produces a smooth sheet of water that is directed away from the side of the spa to the water below. U.S. Pat. No. 5,249,744 to Ruthenburg also discloses a waterfall unit with an internal baffling structure that divides the incoming stream into two laterally flowing streams that reflect off the side walls of the unit and collide with each other, removing most of the turbulence. Jandy® Industries also produces a series of spa waterfalls called Sheer Descent® Falls, with the waterfall taking the form of either rain, a curtain, or an arc, depending on the chosen model.

Spas are usually constructed with one or more light sources that can be both visually appealing and allow for safe use of the spa at night. Conventional lighting units are commonly mounted on the wall of the spa, and comprise a watertight housing containing an incandescent light source. On one side of the housing is an aperture for the power connection, and on the other side is a lens to scatter, direct or focus the light from the light source. This type of spa lighting is illustrated in Waterway Plastics Inc., 1999 Product Catalog, Spa Products, Page 31. A number of variations to the conventional spa light have been developed, such as those disclosed in U.S. Pat. No. 4,617,615 to Eychaner, U.S. Pat. No. 5,122,936 to Guthrie, and U.S. Pat. No. 5,051,875 to Johnson.

With the increased popularity of spa waterfalls, efforts have been made to develop units wherein the water emitted from the horizontal spillway is illuminated. This would make the waterfalls visually appealing at night, particularly if the color of the illumination can be varied.

Polaris Inc. has developed an illuminated waterfall unit. The unit contains a cylindrical acrylic rod that runs the unit's longitudinal length, parallel to the horizontal spillway. A bundle of optical fibers passes light from a source into the rod. The rod is scored at intervals along its length so light passing through it scatters and emits from its side surface.

The Polaris waterfall unit, including its spillway and internal baffling structures, are made of non-transparent, water impervious plastic such as ABS. The rod is positioned so that the spillway blocks its light from illuminating the waterfall. To address this problem, reflective surfaces are provided on the inside surfaces of the unit's body to reflect light from the rod onto the spillway outlet to illuminate the waterfall.

One disadvantage of the Polaris unit is that it is relatively inefficient in illuminating the waterfall. Only a portion of the light reaches the waterfall. Also, some of the reflected light is absorbed or scattered by the water, further reducing the efficiency. Another disadvantage is that the Polaris unit requires a separate bundle of optical fibers for each unit. Illuminating multiple waterfall units in the entire spa can require a prohibitive number of optical fibers. Also, the optical fiber bundle requires the acrylic rod to be relatively thick and it can interfere with the flow of water through the unit.

SUMMARY OF THE INVENTION

The present invention provides a spa waterfall unit with improved illumination of the waterfall emitted from the unit's outlet. A portion of the unit's outlet is transparent and light from within the unit passes through the transparent portion. The light transmitting through the transparent portion and the light passing directly out the outlet combines to illuminate the unit's waterfall.

The new unit generally comprises a manifold body having a water inlet that allows water into the body and a water outlet for water to pass out of the body. A portion of the outlet is transparent and forms the water flowing from the body into a waterfall. An external light guide is arranged to transmit light from a light source to the manifold body. A probe is positioned within the body to transmit light from the light guide into the transparent portion of the outlet. The light passing through the transparent portion and light from the probe illuminate the water flowing from the outlet.

In one embodiment, the new waterfall unit consists of a tubular shaped manifold body with a water inlet, which receives water from the spa's plumbing system. The water turbulence is removed by internal baffles that the water passes as it fills the body. The body's outlet is in the form of a longitudinal spillway, with a transparent outlet fitting mounted within the spillway to form the water running out of the outlet into a waterfall. As water fills the body, it spills through the outlet fitting in the form of a waterfall. Depending on the outlet fitting used, different types of waterfalls can be formed, including a clear laminar sheet, rain drops, arc, fountain, double arc, pulsating, or any combination thereof.

The internal probe is elongated and is positioned longitudinally in the manifold body, behind the transparent outlet fitting. The preferred external light guide is an optical fiber that transmits light from the light source to the probe, with the light emitting primarily from the end of the optical fiber. A portion of the probe's light passes through the transparent outlet cap.

The new waterfall unit is more efficient than previous units in illuminating its waterfall. By making the outlet cap transparent, the light does not have to be reflected within the manifold body to contribute to the waterfall illumination. Less of the light will be scattered and absorbed. The outlet cap transmits and guides the light from the probe in the direction of the waterfall allowing more of the probe's light to illuminate the waterfall. Because of its efficient illumination, the waterfall unit can operate with only a single optical fiber, rather than a fiber bundle. This significantly reduces the total number of fibers needed to illuminate multiple waterfall units in a spa, reducing the spas cost and complexity. Use of a single fiber also allows the probe to be narrow and thus reduces interference with the flow of water through the body.

These and further features and advantages of the invention will be apparent to those skilled in the art from the following detailed description, taken together with the accompanying drawings, in which:

DETAILED DESCRIPTION OF THE INVENTION

One embodiment of a new spa waterfall unit 10 with optical fiber illumination constructed in accordance with the invention is shown in FIGS. 1–4. The new unit 10 is particularly adapted to be positioned at the edge of a spa. It is positioned above the water line of the spa, with the majority of the unit 10 positioned behind the spa's water contacting wall. The waterfall unit 10 receives water from the spa's plumbing water supply, and emits a waterfall into the spa.

Figure 1:
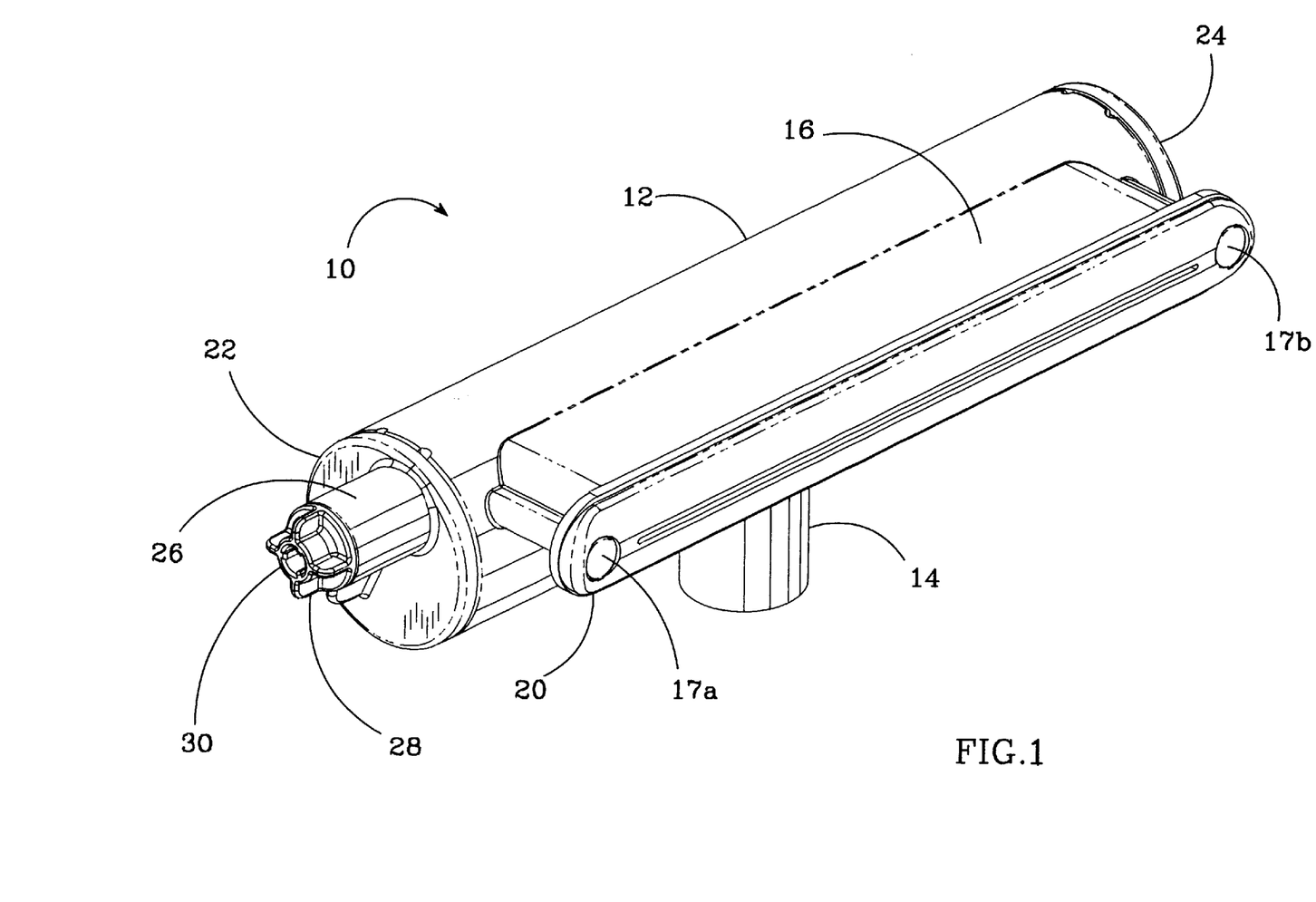
FIG. 1 is a perspective view of one embodiment of the new waterfall unit with fiber optic illumination.
Figure 2:
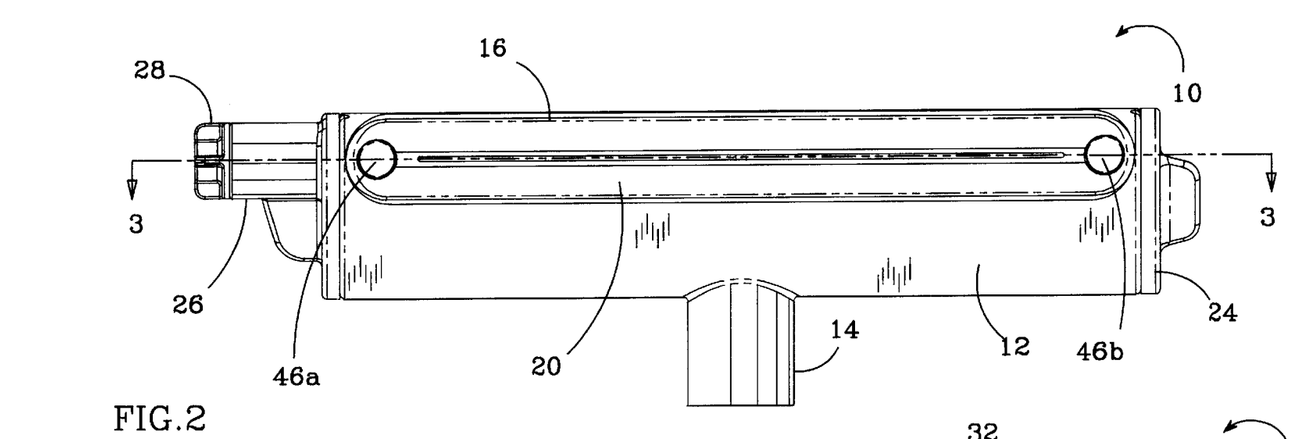
FIG. 2 is an elevation view of the waterfall unit shown in FIG. 1.

FIGS. 1 and 2 show the waterfall unit 10 as assembled. It has an elongated cylindrical body 12 with a water inlet 14 to receive a standard water supply from the spa plumbing system. The water enters the body 12 through the inlet 14 and fills the body 12. A slender spillway outlet 16 is preferably formed horizontally near the top of the body 12. The opening in the outlet passes through to the interior of the body 12 and provides the path for water to flow from the body 12. As the water fills the body 12, the water spills out through the outlet.

A removable outlet fitting 20 is inserted in the outlet 16 and is mounted in the end of the outlet 16 by mounting screws 17a and 17b. The fitting 20 forms the water flowing through the outlet 16 into a particular type of waterfall. Different waterfall types include laminar sheet, rain drops, arc, pulsating, fountain, double arc, or any combination thereof. Instead of being removable, the outlet fitting can also be formed integrally with the outlet 16 or it can be permanently affixed to the outlet.

The body 12 has opposite plates 22 and 24 bonded with a watertight seal to its open ends. End plate 22 has a cylindrical outer sleeve 26 extending horizontally from its outer surface. The sleeve is positioned near the top of the body 12 and receives a probe holding plug 28. The plug has a optic fiber opening 30 for housing the end of an optical fiber (not shown), with the fiber held in place by a commercially available press fit metal crimp (not shown). As more fully described below, a lighting probe is held within the body 12 between the holding plug 28 and the end plate 24.

Figure 3:
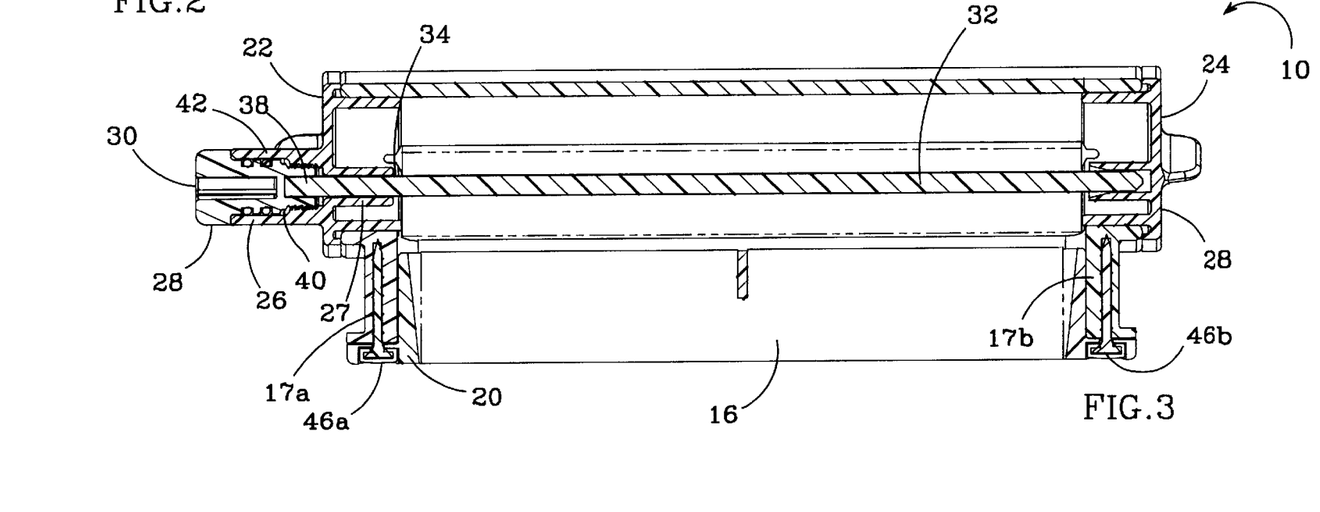
FIG. 3 is a sectional view of the spa waterfall unit shown in FIG. 2, taken along section lines 3—3.
Figure 4:
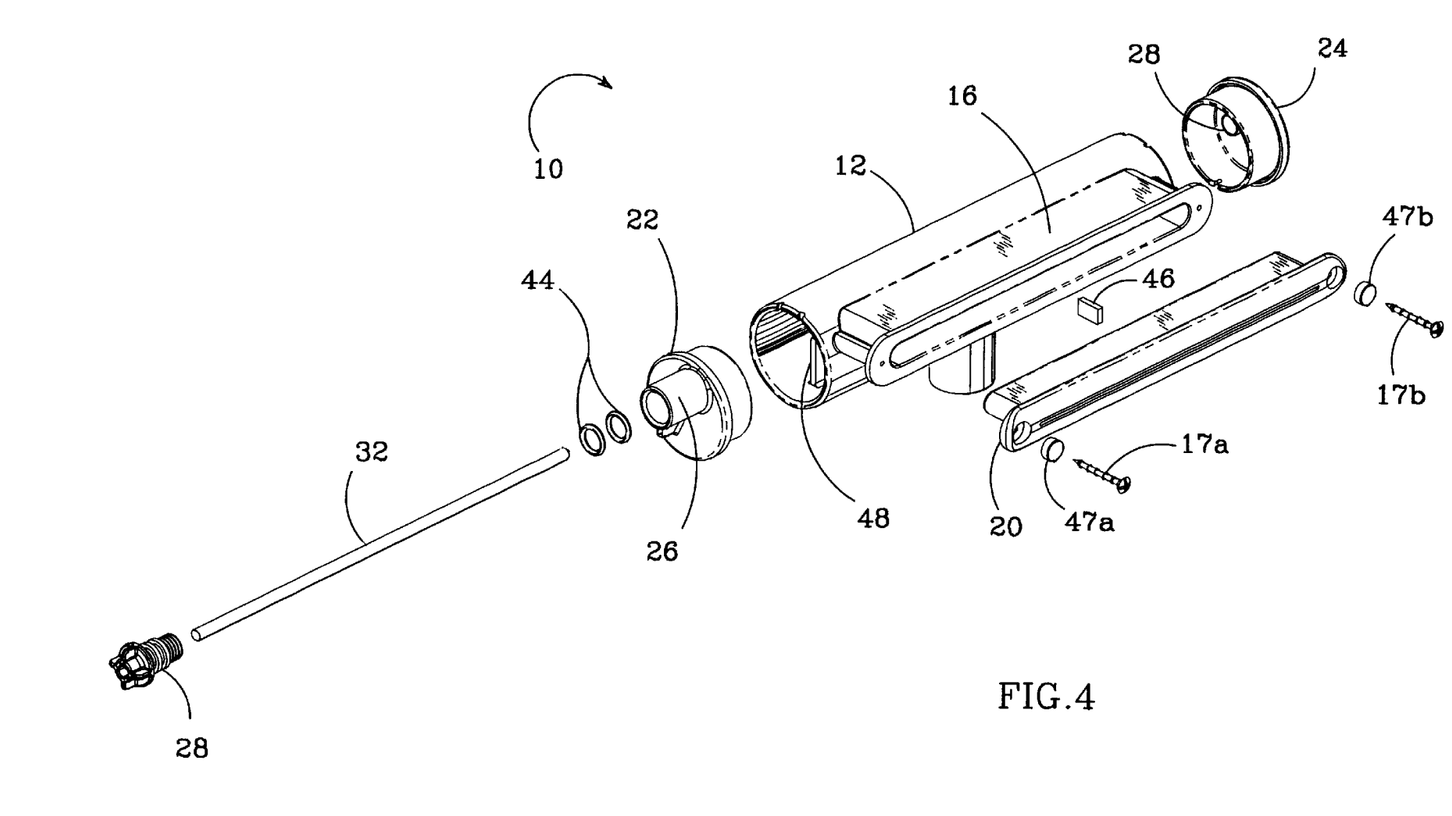
FIG. 4 is an exploded view of the spa waterfall unit shown in FIG. 1.

Referring now to FIGS. 3 and 4, an elongated transparent probe 32 runs longitudinally through body 12 near its top and aligned with the inner edge of the outlet fitting 20. The probe 32 is inserted through a hole 34 in the end plate 22 and held in place by close fits within the sleeves 27 and 28, which project into the body from its end plates 22 and 24 respectively. The probe's rear end projects out through hole 34 and into the outer sleeve 26.

Plug 28 includes an opening 38 that accommodates the outer end of probe 32, and outer threading 42 that mates with interior threading 40 on the sleeve 26 so that the plug can be screwed into the sleeve to hold the probe in place. Sealing gaskets 44 provide a watertight seal between the plug 28 and end sleeve 26.

A separator 46 is included between the upper and lower walls of the outlet 16 to keep them separated and ensures an uninterrupted flow of the waterfall. After the outlet fitting 20 is installed in the outlet 16, screw caps 47a and 47b are press fit over the screws 17a and 17b to hide and protect them. The body 12 also has an internal baffle 48 positioned to remove most of the turbulence from the water entering the body 12 through the inlet 14.

Most of the waterfall's parts are made of a nontransparent water impervious plastic such as ABS or PVC. However, the probe 32, plug 28 and spillway cap 20 are made of a transparent material such as acrylic.

In operation, water fills the body 12 through the inlet 14, with the baffle 48 removing most of the water's turbulence. The water passes the baffle 48 and emits as a waterfall from the outlet fitting 20. An optical fiber is inserted into the fiber opening 30 to transmit light from a light source to the waterfall unit 10. Light emitted from the end of the optical fiber passes through the transparent plug 28 and into the probe 32. The light continues down the probe and emits out the surfaces of the probe, illuminating the interior of the body 12.

Both the outlet fitting 20 and the water flowing through the outlet 16 transmit a portion of the probe's emitted light to illuminate the waterfall as it flows from the outlet 16. The illumination is enhanced if the interior of the body 12 is reflective to add reflected light to the light transmitted directly through the fitting 20 and outflowing water.

Figure 5:
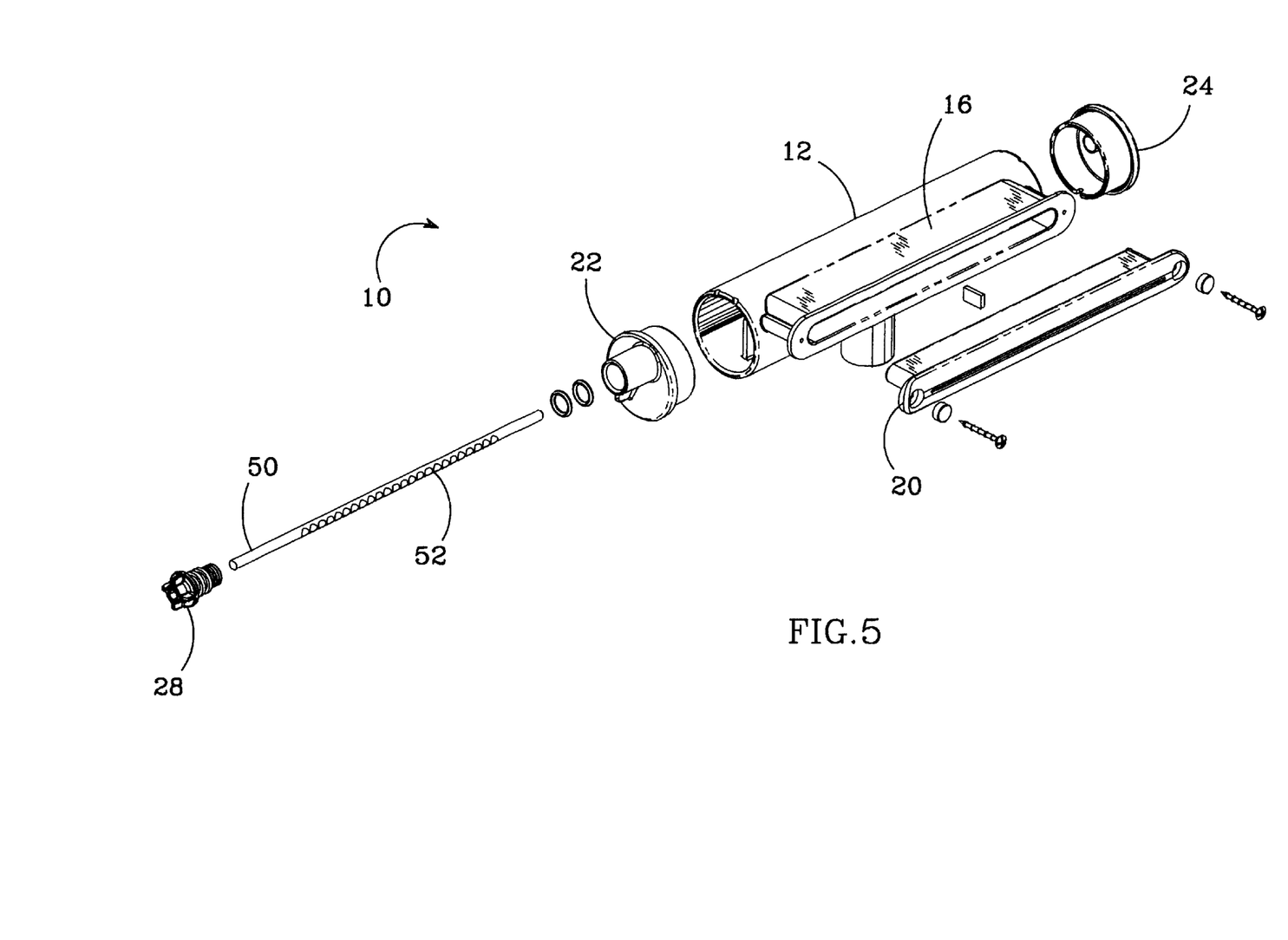
FIG. 5 is an exploded view of the spa waterfall unit shown in FIG. 1, with an alternative probe embodiment.

FIG. 5 shows another embodiment of the spa waterfall 10 that is the same in most respects as the waterfall shown in FIGS. 1–4. However, in this embodiment the probe 50 has scores 52 down most of its length. The scores scatter the light that passes down the probe 50, encouraging light emission at the scores 52. In the preferred embodiment, the probe 50 is scored down its length at a location that is adjacent to the back of the outlet fitting 20. By encouraging light emission at the scores 52, more light emits from the probe 50 adjacent to the outlet fitting 20.

The outlet fitting 20 is easily removed and replaced by removing screws 17a and 17b from the outlet 16 and sliding the outlet fitting 20 out of cavity in the outlet 16. The same or different fitting 20 can be replaced by sliding it back into the outlet 16 and tightening the screws 17a and 17b back into the outlet. This is particularly useful for replacing the fitting 20 with a different type that produces one of the different waterfall types described above. In addition, debris often gets stuck in the waterfall unit 10 and interferes with formation of the waterfall. By removing the outlet fitting 20, the debris can be removed and the fitting 20 can be replaced. Also, a new fitting 20 can be installed to replace one that is damaged.

Figure 6:
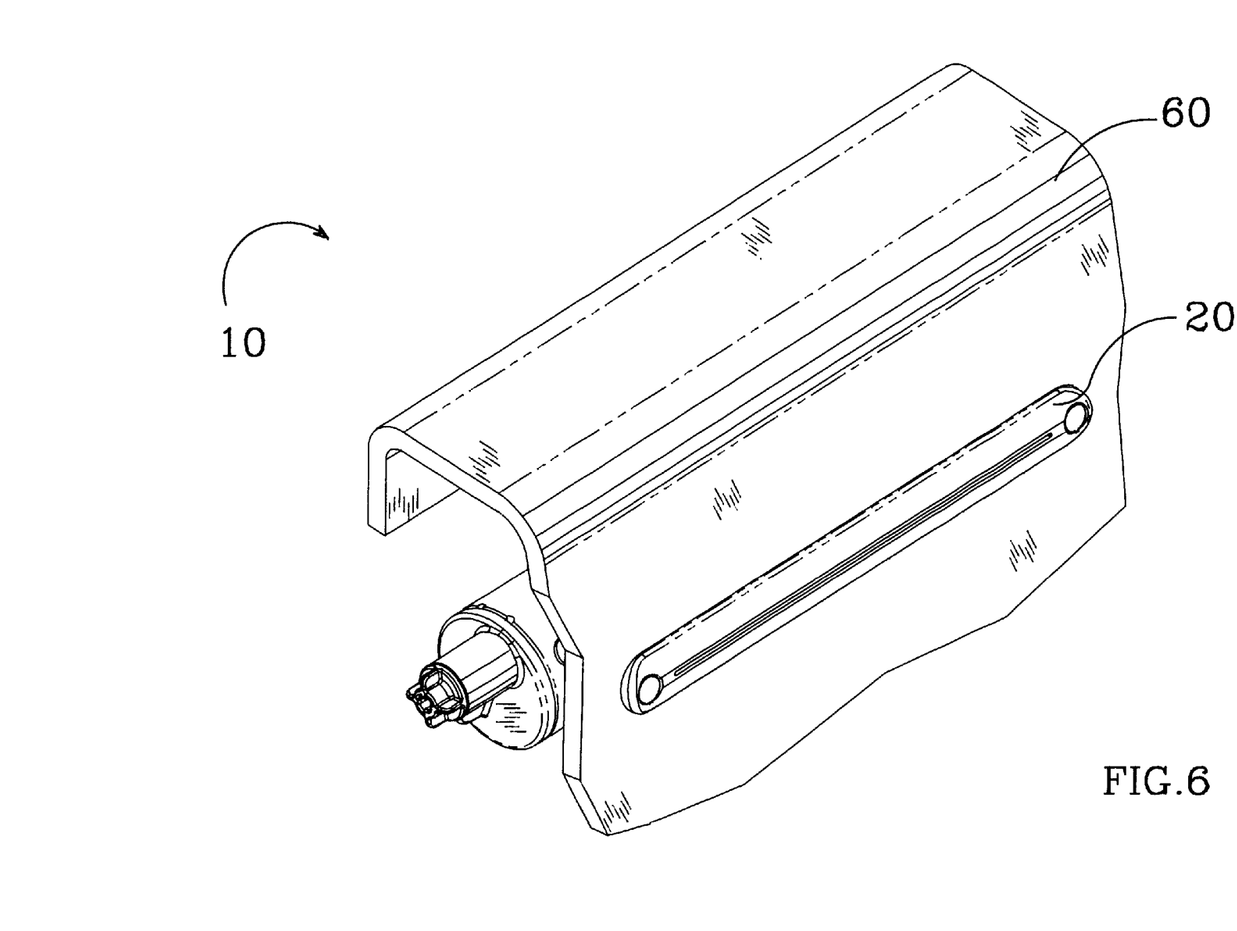
FIG. 6 is a perspective view of the waterfall unit shown in FIG. 1, installed in the wall of a spa.
Figure 7:
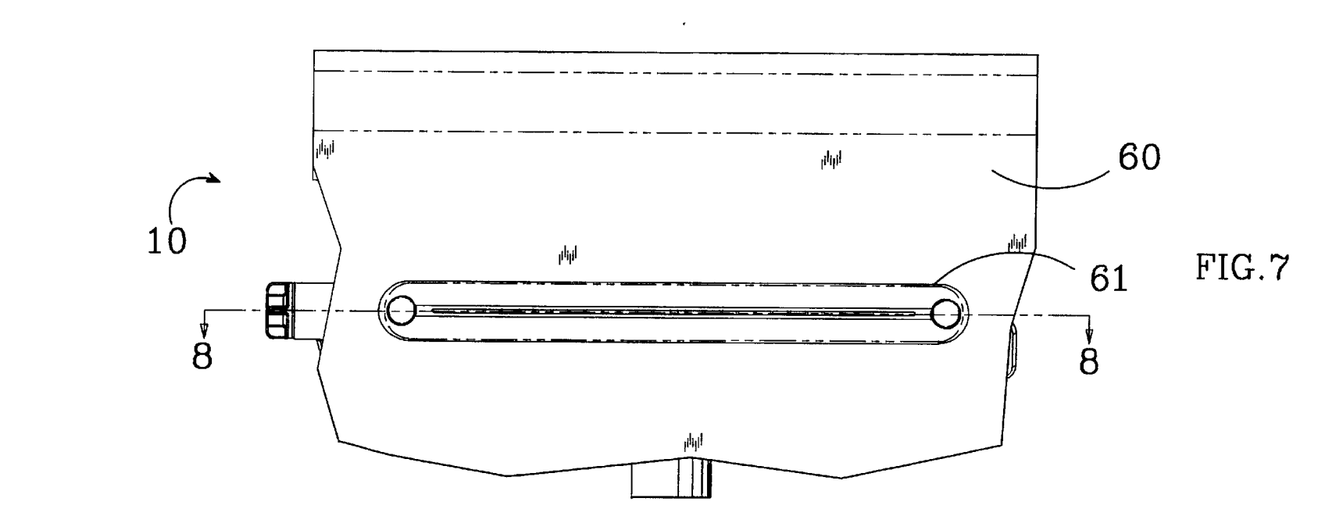
FIG. 7 is an elevation view of the waterfall unit shown in FIG. 6.
Figure 8:
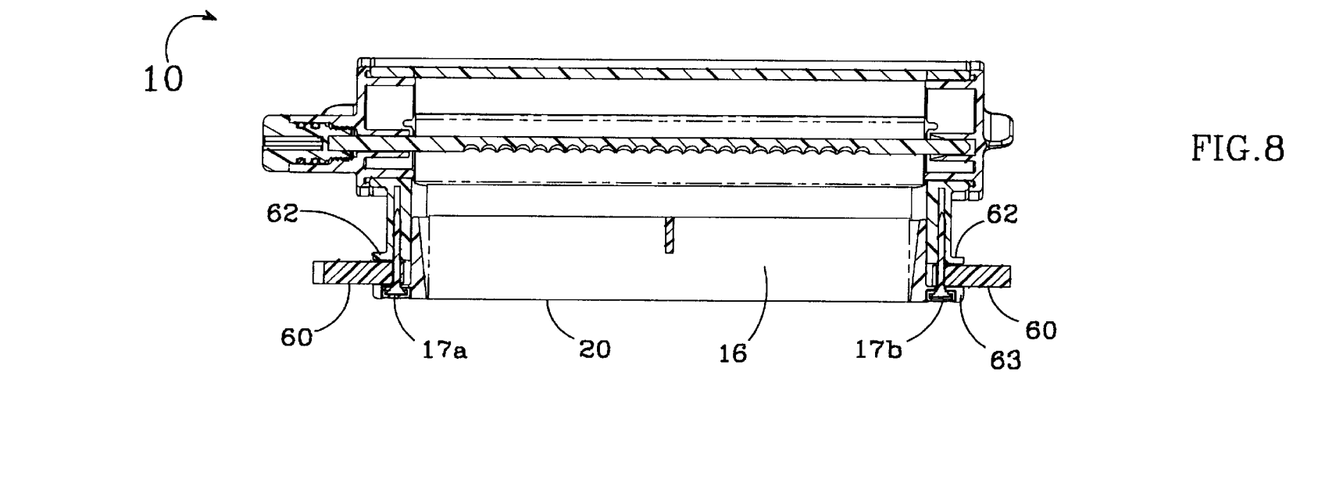
FIG. 8 is a sectional view of the waterfall unit in FIG. 7, taken along section lines 8—8.

FIGS. 6–8 show one of the ways that the new waterfall unit 10 can be installed in a spa wall 60. The majority of the waterfall unit 10 is behind the spa wall 60 with only the outlet fitting 20 being visible from within the spa. To install the waterfall, a hole 61 is formed in the spa wall having a size that allows the outlet fitting 20 to be inserted into the hole with a close fit, but leaving room at the ends of the hole for screws 17a and 17b to pass. The outlet 16 has a flange 62 that is held against the outside surface of the wall with the outlet 16 aligned with the wall hole 61. The outlet fitting 20 is inserted into the wall hole 61 and into the outlet 16, with the outlet cap flange 63 against the water-contacting surface of the spa wall 60. The screws 17a and 17b are tightened into their respective holes to mount the outlet fitting 20 in the outlet 16. When the screws are fully tightened, the spa wall 60 is sandwiched between the outlet and outlet cap flanges 62 and 63, holding the spa waterfall 10 to the spa wall 60. To ensure a watertight seal, gaskets (not shown) can be included between the respective flanges and the spa wall 60.

Figure 9:
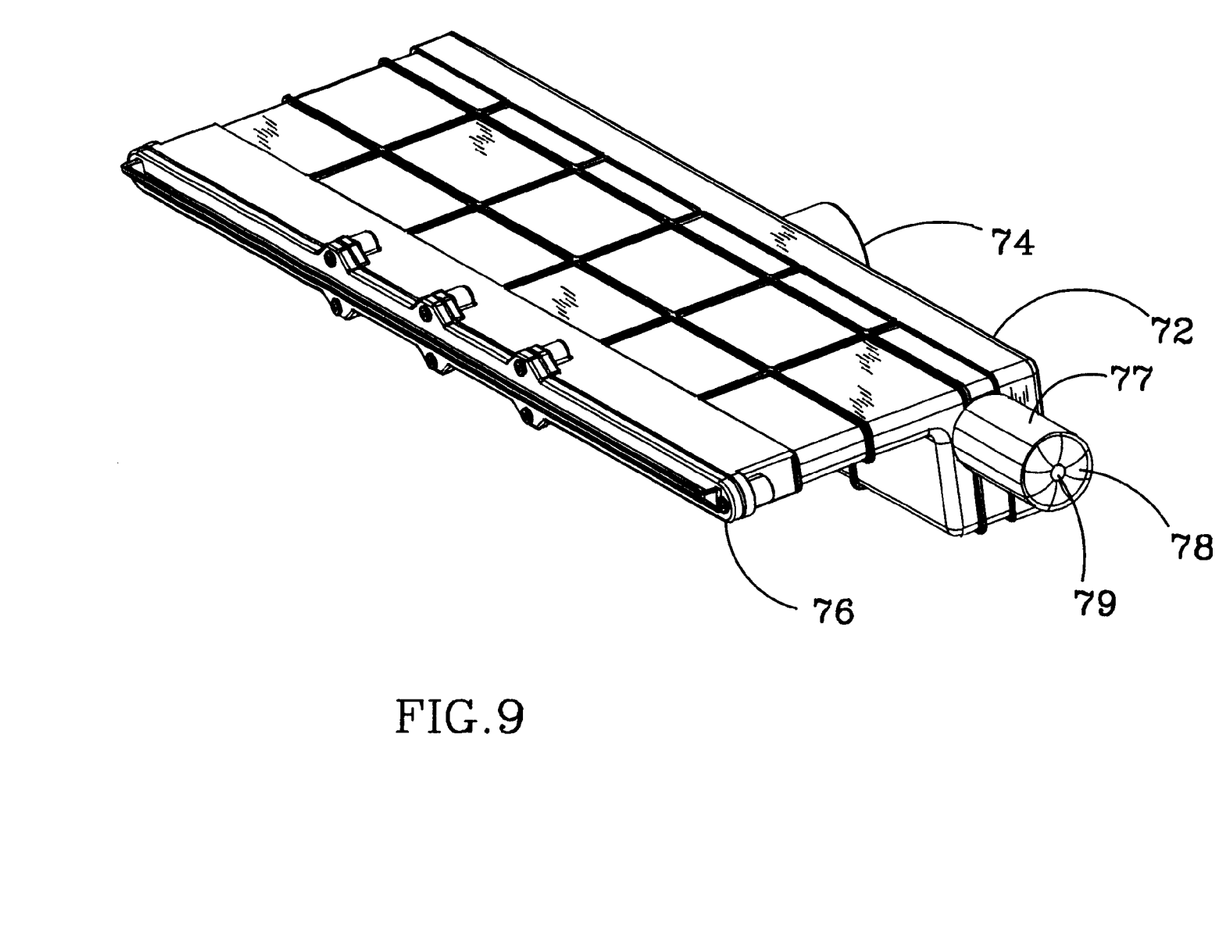
FIG. 9 is a perspective view of a another embodiment of the new waterfall unit particularly adapted for use in pools.

FIG. 9 shows another embodiment of the new waterfall unit 70 that is particularly adapted for use in pools. It consists primarily of a rectangular shaped and elongated manifold body 72 having a water inlet 74 for connection to the pool's plumbing system. The unit has internal baffles similar to the previous embodiment that are positioned to remove most of the turbulence from the water entering the unit 70. The unit also has a spillway outlet 75 that provides a path for water out of the body 72. The outlet 75 runs along the top edge of the body 72, opposite the inlet 74. A transparent outlet fitting 76 is fitted into the outlet 75 and mounted to it to form the water from it into a waterfall. Similar to the above embodiments, the unit 70 has an internal elongated probe (not shown) held longitudinally within the body 72, adjacent to the back of the transparent fitting 76. Like above, the probe is inserted into a hole in the outer sleeve 77, and plug 78 is mated within the sleeve to hold the probe within the body 72. The plug has an optical fiber opening 79 to hold an optical fiber. The waterfall emitting from the unit 70 is illuminated in the same way as the embodiment above and its internal probe can be scored such that light emission is encouraged adjacent to the fitting 76.

Figure 10A:
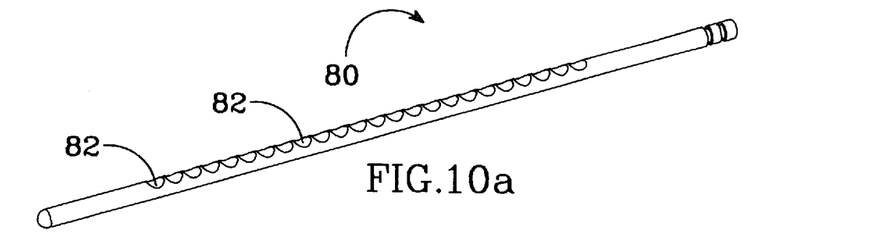
FIGS. 10a to 10e are perspective views of different embodiments of the elongated probe.
Figure 10B:
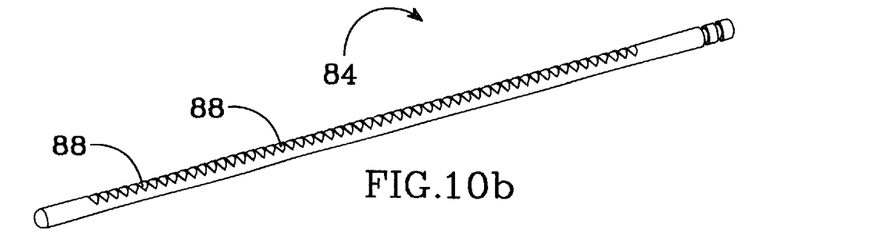
Figure 10C:
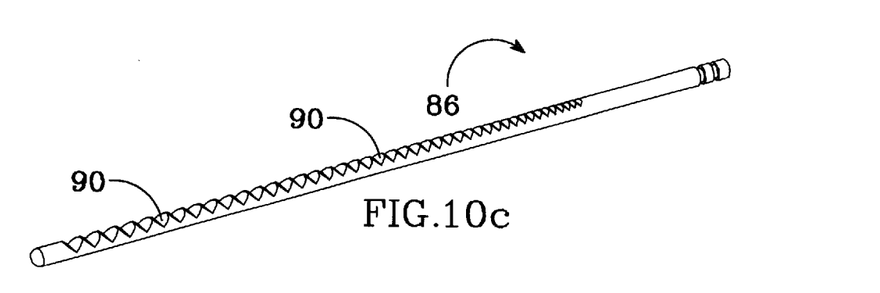

FIGS. 10a–e show different embodiments of the probe that can be used in addition to the smooth and scored probes 32 and 50 discussed above. Probe 80 in FIG. 10a has numerous hemispheric cutouts 82 in longitudinal alignment along the probe's surface. As light passes down the probe 82, light is reflected of the cutouts and is primarily emitted from the probe's surface opposite the cutouts. FIGS. 10b and 10c show probes 84 and 86 having cutouts 88 and 90 aligned along their respective probe's surface similar to probe 80. However, the cutouts 88 and 90 have a wedge shape similar to an orange slice and in probe 86 the wedges 90 increase in size down the probe. By increasing in size, the wedges 90 reflect approximately the same amount of light as the intensity of light down the probe decreases.

Figure 10D:
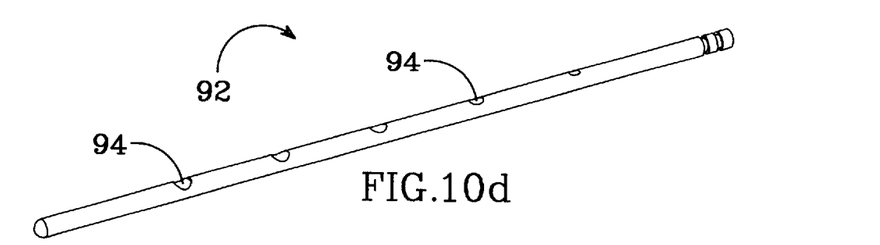

The probe 92 in FIG. 10d also has hemispheric shaped cutouts 94, but unlike the probe 80 in FIG. 10a the cutouts 92 are spaced and increase in size down the probe. By having fewer cutouts 94 more of the light passes down the probe and by increasing the cutout size a similar amount of light is refracted at each cutout as the intensity of the light decreases down the probe.

Figure 10E:
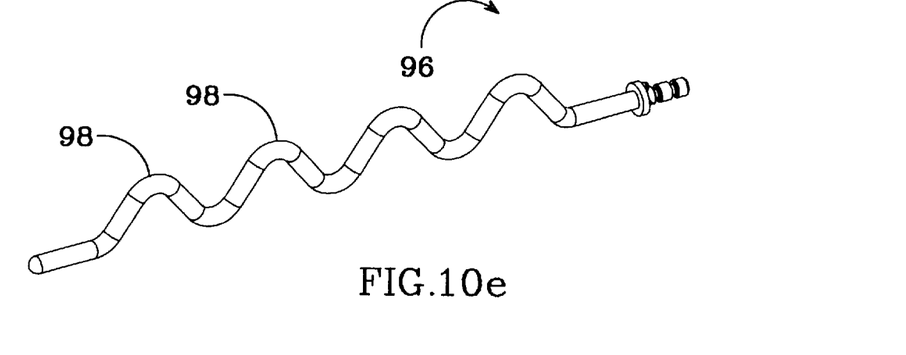

The probe 96 in FIG. 10e has bends 98 down its length and light emission is encouraged at the bends. One advantage of this probe is that the bends 98 can be arranged within the particular waterfall body so that they are closer to the back of the transparent outlet fitting. The emitting light has less of chance to scatter so that most of the light emitting from the bends 98 enters the fitting 20 to illuminate the waterfall. However, this probe is more complex to manufacture and for many of the probe materials it is difficult to produce a probe with bends.

Figure 11:
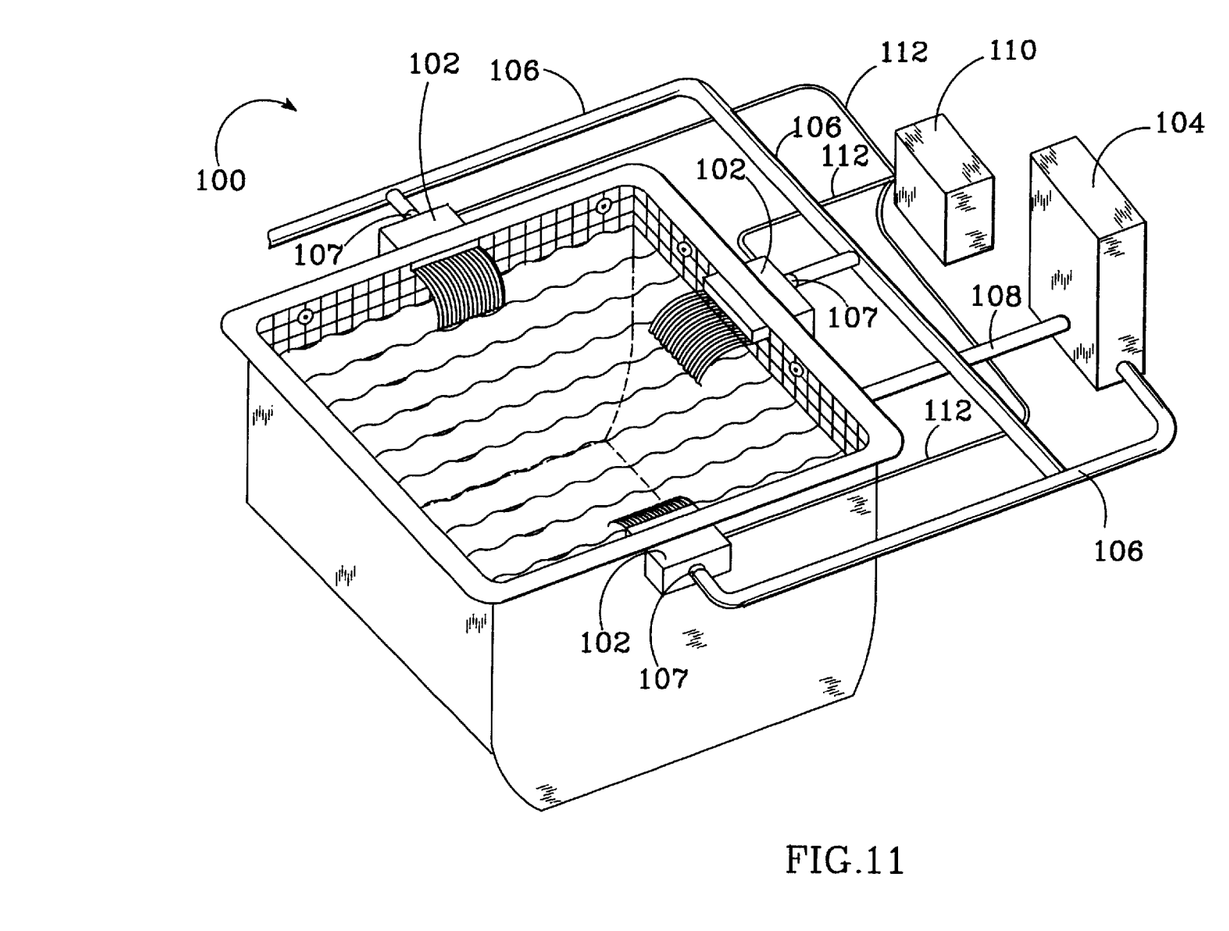
FIG. 11 is a perspective view of a spa using new illuminated waterfall units.

As shown in FIG. 11, multiple spa waterfall units 102 can be installed in a spa 100 in various locations. The waterfalls units 102 are connected to a water pump 104 that circulates water throughout the spa 100 by a series of water conduits 106. Water flows from the spa 100 to the pump 104 by a return water conduit 108. Conduits 106 are affixed to the water inlets 107 of the respective waterfall units 102. Water flows into the units 102 and then into the spa 100, completing the loop.

A fiber optic light source 110 provides light that is carried by optical fibers 112 to the waterfall units 102, and to any other desired component such as a jet, drain or water return. The light source 110 can have a single color, or it can include a color wheel that rotates to continuously change the color. The waterfall units 102 have one or more optical fibers 112 to provide the light from the light source 110. As described above, the light emits from the ends of the optical fibers 112 and passes into each unit's probe and through the spillway caps to illuminate the water emitting from the units 102. Alternative spa embodiments can have more than one light source of different colors.

Although the present invention has been described in considerable detail with reference to certain preferred configurations, other versions are possible. Different spa, pool or tub components can use the invention for water illumination. The probe can be positioned and held with the components in different ways. Therefore, the spirit and scope of the appended claims should not be limited to the preferred versions described above.

We claim:

1. A spa waterfall unit, comprising:
   a manifold body;
   a water inlet into said body;
   a water outlet having an opening to pass water out of said body in the form of a waterfall, said outlet having a transparent outlet cap capable of transmitting light from the interior of said body; and
   a probe disposed within said body to receive light and in response illuminate the waterfall by optical transmission through said outlet opening and said transparent outlet cap.

2. The waterfall unit of claim 1, wherein said water outlet comprises an spillway outlet projecting from the top of said manifold body and an outlet fitting, said outlet fitting mounted in said outlet and forming the water from said outlet into a waterfall.

3. A spa waterfall unit, comprising:
   a manifold body;
   a water inlet into said body;
   a water outlet to pass water out of said body in the form of a waterfall, a portion of said outlet capable of transmitting light from the interior of said body; and
   a probe disposed within said body to receive light and in response illuminate the waterfall by optical transmission through said outlet, wherein said probe is bent down its length to encourage light emission adjacent to said outlet.

4. A spa waterfall unit, comprising:

a manifold body;

a water inlet into said body;

a water outlet having an opening to pass water out of said body in the form of a waterfall, wherein said water outlet comprises a spillway outlet projecting from the top of said manifold body and a transparent outlet fitting capable of transmitting light from the interior of said body, said outlet fitting mounted in said spillway outlet and forming the water from said outlet into a waterfall; and a probe disposed within said body to receive light and in response illuminate the waterfall by optical transmission through said outlet opening and said outlet fitting, wherein a portion of the light from said probe is transmitted into and through said outlet fitting, light from said probe and light transmitted through said outlet fitting combining to illuminate the waterfall emitting from said outlet.

5. The waterfall unit of claim 4, further comprising an external light guide arranged to transmit light from a light source to said probe.

6. The unit of claim 5, wherein said probe emits light within the interior of said body with at least a portion of the light from said probe passing into and through said transparent portion of said outlet, light from said probe and light passing through said transparent portion combining to illuminate said waterfall.

7. The waterfall unit of claim 5, wherein said light guide comprises an optical fiber.

8. The waterfall unit of claim 5, wherein said light source is a fiber optic light source.

9. The waterfall unit of claim 4, wherein said manifold body is elongated and said probe is elongated, said probe being disposed longitudinally within said manifold body.

10. The waterfall unit of claim 8, wherein said probe is held adjacent to said outlet such that light from said probe enters the transparent portions of said outlet.

11. The waterfall unit of claim 4, wherein said manifold body includes an opening that receives said probe, said probe being held longitudinally in said manifold body.

12. The waterfall unit of claim 11, further comprising a plug mounted over said manifold opening and holding said probe within said manifold body, said plug providing a watertight seal with said opening.

13. The waterfall unit of claim 12, wherein said plug is transparent and further comprises a light guide opening to receive the light guide, light from said light guide passing through said plug into said probe.

14. The waterfall unit of claim 4, wherein said outlet fitting is removable and replaceable from said outlet.

15. The waterfall unit of claim 4, wherein said probe is scored to encourage light emission adjacent to said outlet.

16. The waterfall unit of claim 4, wherein said probe has hemispheric cutouts down its length to encourage light emission adjacent to said outlet.

17. The waterfall unit of claim 4, wherein said probe has wedge shaped cutouts down its length to encourage light emission adjacent to said outlet.

18. A system for illuminating a waterfall, comprising:

a reservoir shell capable of holding water;

at least one waterfall unit positioned to receive water and emit a waterfall to the surface of water held in said reservoir shell;

a water pump system that circulates water between said reservoir and each of said waterfall units; and each of said waterfall units including a probe positioned within it and an outlet having an opening and a transparent outlet cap, said probe arranged to receive light and in response illuminate the waterfall emitting from said waterfall unit by optical transmission through said outlet opening and said transparent outlet cap.

19. The system of claim 18, wherein each waterfall unit has water outlet to pass water out of said body in the form of a waterfall, at least a portion of the light from said probe passing into and through said transparent portion of said outlet, light from said probe and light passing through said transparent portion combining to illuminate the waterfall.

20. The system of claim 19, wherein each outlet comprises a horizontal spillway outlet and a outlet fitting, said outlet projecting from the top of said waterfall unit, said outlet fitting mounted in said outlet and forming the water from said outlet into a waterfall.

21. A device for providing an illuminated waterfall to a water reservoir, comprising:

a device body capable of receiving water;

a device outlet having an opening to the inside of said body, said outlet adapted to extend through the wall of a reservoir and convert water received by said body into a waterfall, said device outlet further comprising an outlet member that is transparent to the interior of said body, at least one of the surfaces of said member being an exterior surface of said device; and a light source internal to said body, a portion of the light from said light source passing into and through said outlet member, the light from said internal light source passing through said opening and light passing through said member combining to illuminate said waterfall.

22. The device of claim 21, wherein said device outlet comprises a spillway outlet and an outlet fitting, said outlet fitting mounted in said outlet and forming the water from said outlet into a waterfall.

23. A system for illuminating a waterfall, comprising:

a reservoir shell capable of holding water;

at least one waterfall unit positioned to receive water and emit a waterfall to the surface of water held in said reservoir shell;

a water pump system that circulates water between said reservoir and each of said waterfall units;

each of said waterfall units including a probe positioned within it and an outlet to pass water out of said body in the form of a waterfall, said probe arranged to receive light and in response illuminate the waterfall emitting from said waterfall; and each said outlet comprising a horizontal spillway outlet and a outlet fitting, said spillway outlet projecting from the top of said waterfall unit and said outlet fitting mounted in said spillway outlet and forming the water from said outlet into a waterfall, wherein each said outlet fitting is transparent and a portion of the light from said probe being transmitted into and through said outlet fitting, light from said probe and light transmitted through said outlet fitting combining to illuminate the waterfall emitting from said outlet.

24. The system of claim 23, further comprising a remote light source and at least one light guide, each said light guide arranged to transmit light from said remote light source to one of said at least one waterfall unit.

25. The system of claim 23, wherein each of said light guides comprises optical fibers.

26. A The system of claim 23, wherein each said at least one waterfall unit and each said probe is elongated, each said waterfall unit including an opening for said probe to be mounted within the waterfall unit with a watertight seal.

27. The system of claim 23, wherein said probe is held adjacent to said outlet such that light from said probe enters said outlet fitting.

28. A device for providing an illuminated waterfall to a water reservoir, comprising:

a device body capable of receiving water;

a device outlet having an opening to the inside of said body, said outlet adapted to extend through the wall of a reservoir and convert water received by said body into a waterfall, said device outlet comprising a spillway outlet and an outlet fitting, said outlet fitting mounted in said spillway outlet and forming the water from said outlet into a waterfall, said outlet fitting being transparent to the interior of said body and;

a light source internal to said body, a portion of the light from said interior light source being transmitted into and through said outlet fitting, light from said light source and light transmitted through said outlet fitting combining to illuminate the waterfall emitting from said outlet.

29. The device of claim 28, wherein said internal light source comprises a probe, a optical fiber and a remote optical fiber light source, said probe disposed within said body and capable of receiving light from said optical fiber, said optical fiber transmitting light from said optical fiber light source to said probe.

30. The device of claim 28, wherein said manifold body is elongated and said probe is elongated, said probe being disposed longitudinally within said body.

31. The device of claim 30, wherein said probe is held adjacent to said outlet such that light from said probe enters the transparent portions of said outlet.

* * * * *